Figure 1:
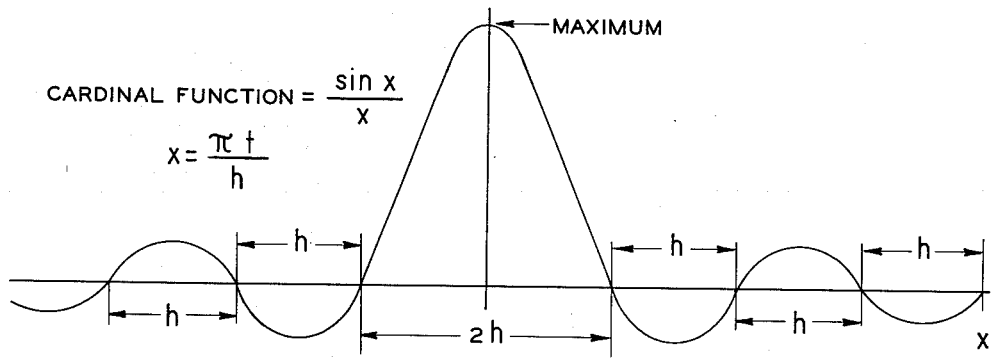

Aug. 17, 1965

R. G. PIETY 3,201,706

TUNING SYSTEM

Filed May 9, 1960

5 Sheets-Sheet 1

INVENTOR.
R.G. PIETY

BY *Hudson & Young*

INVENTOR.
R. G. PIETY
BY Hudson & Young
ATTORNEYS

INVENTOR.
R. G. PIETY
BY Hudson & Young
ATTORNEYS

INVENTOR.
R. G. PIETY
BY Hudson + Young
ATTORNEYS

Aug. 17, 1965    R. G. PIETY    3,201,706
TUNING SYSTEM

Filed May 9, 1960    5 Sheets-Sheet 5

INVENTOR.
R. G. PIETY
BY
*Hudson & Young*
ATTORNEYS

United States Patent Office 3,201,706
Patented Aug. 17, 1965

3,201,706
TUNING SYSTEM
Raymond G. Piety, Bartlesville, Okla., assignor to Phillips Petroleum Company, a corporation of Delaware
Filed May 9, 1960, Ser. No. 27,654
4 Claims. (Cl. 328—167)

This invention relates to a signal tuning system, employing an electrical delay line. In another aspect it relates to an improved electrical delay line. In still another aspect it relates to an improved tapped delay line filter.

Seismic exploration techniques are employed to study subsurface geology, structure, and deposits. A major use of such techniques is the location of petroleum and/or natural gas reservoirs. Briefly, the seismic exploration technique involves detonating an explosive charge and recording and measuring the vibrations produced.

Ideally, the recorded vibrations are only those produced by the energy pulse from the vibration being transmitted down through the earth to an intersurface, e.g., a rock stratum, and reflected therefrom (and from strata at succeeding lower depths) to the recording device. Practically this is not the case, because of "noise" caused by wind soughing on grass, highway traffic, and so forth. This noise can obliterate the true seismic signal, or so dilute it as to prevent its recognition on a recorded trace.

Synthetic signals such as these are generated in a delay line filter. According to my invention, an improved delay line filter is provided which responds to a pulse by producing a plurality of time-spaced wave forms approximated by the cardinal function of interpolation theory $$\frac{\sin x}{x}$$

Means are provided for summing these wave forms to approximate by interpolation the desired synthetic signal.

Hence, it is an object of my invention to provide an improved signal tuning system. A further object is to provide such a tuning system employing an electrical delay line. Another object of my invention is to provide an improved tapped electrical delay line.

Apparatus constructed in accordance with this invention is suitable for use in U.S. Letters Patent 2,450,352, issued to myself as inventor on September 28, 1948. Still another application for apparatus constructed in accordance with this invention is to include the same in computing network of the type shown in U.S. Letters Patent 2,908,889, issued to myself as inventor on October 13, 1959.

A further object of my invention is to provide a means for setting up a seismograph tuning operator of any conceivable wave form. Apparatus constructed in accordance with these objects and with this invention has the very considerable advantage that all possibilities can be explored without stopping to design a special network for each individual case.

Other objects, advantages, and features will become apparent from the following disclosure and by reference to the drawings accompanying it, wherein:

FIGURE 1 is a graph of the cardinal function $$\frac{\sin x}{x}$$

Figure 2:
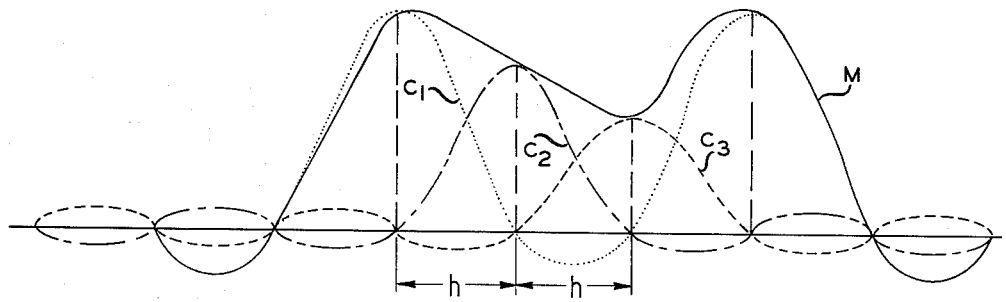
Figure 3:
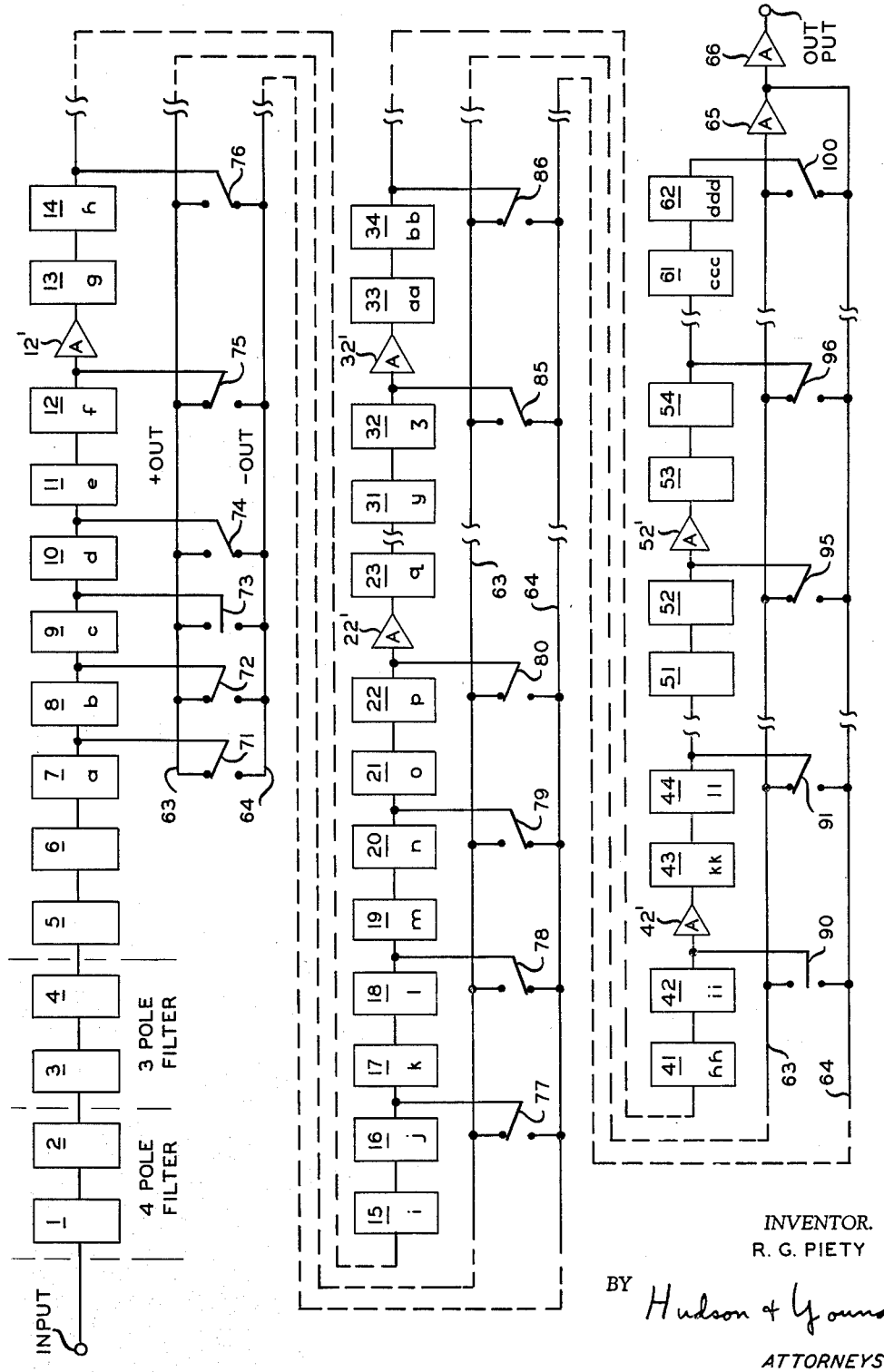
Figure 4:
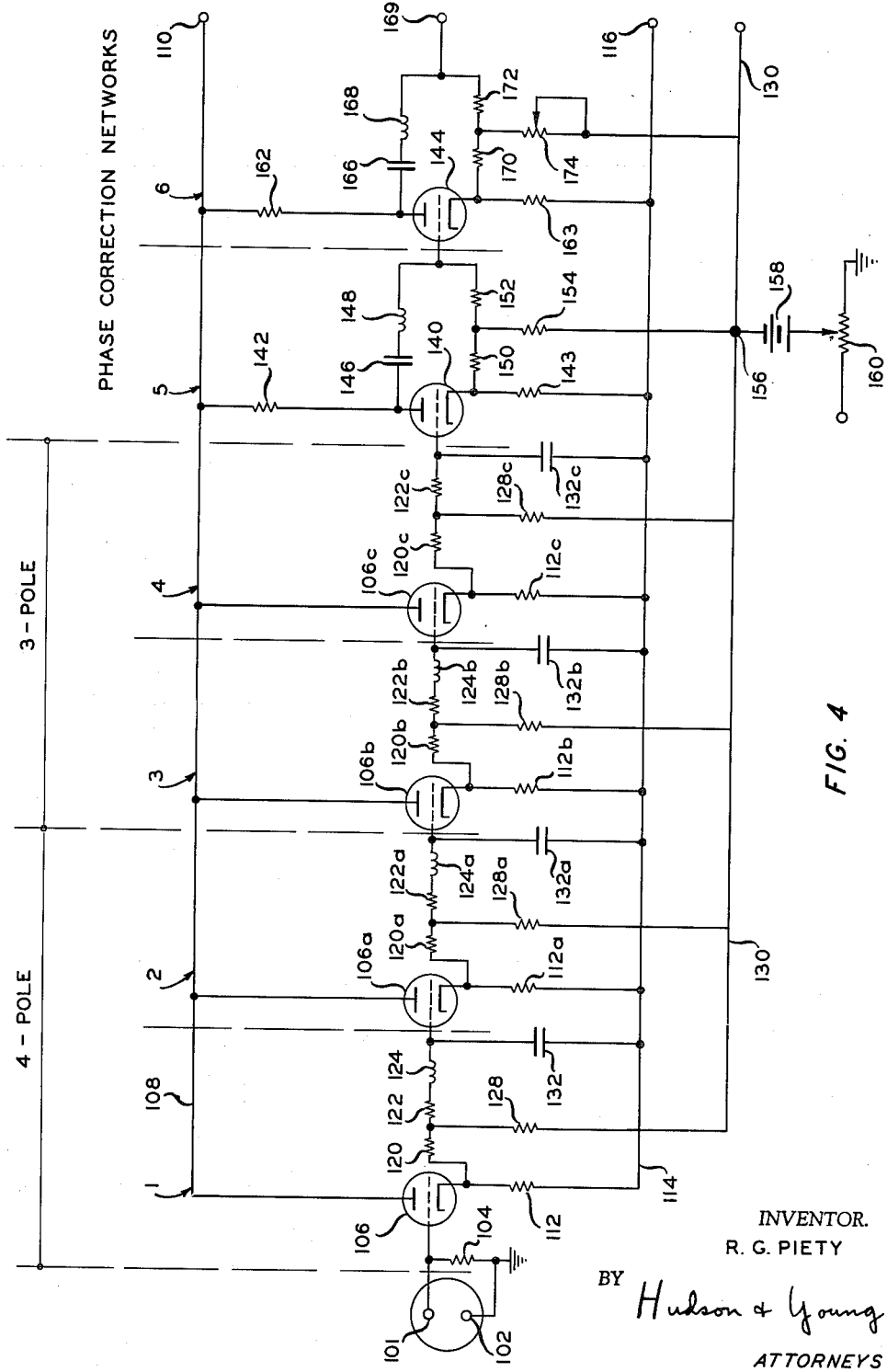
Figure 5:
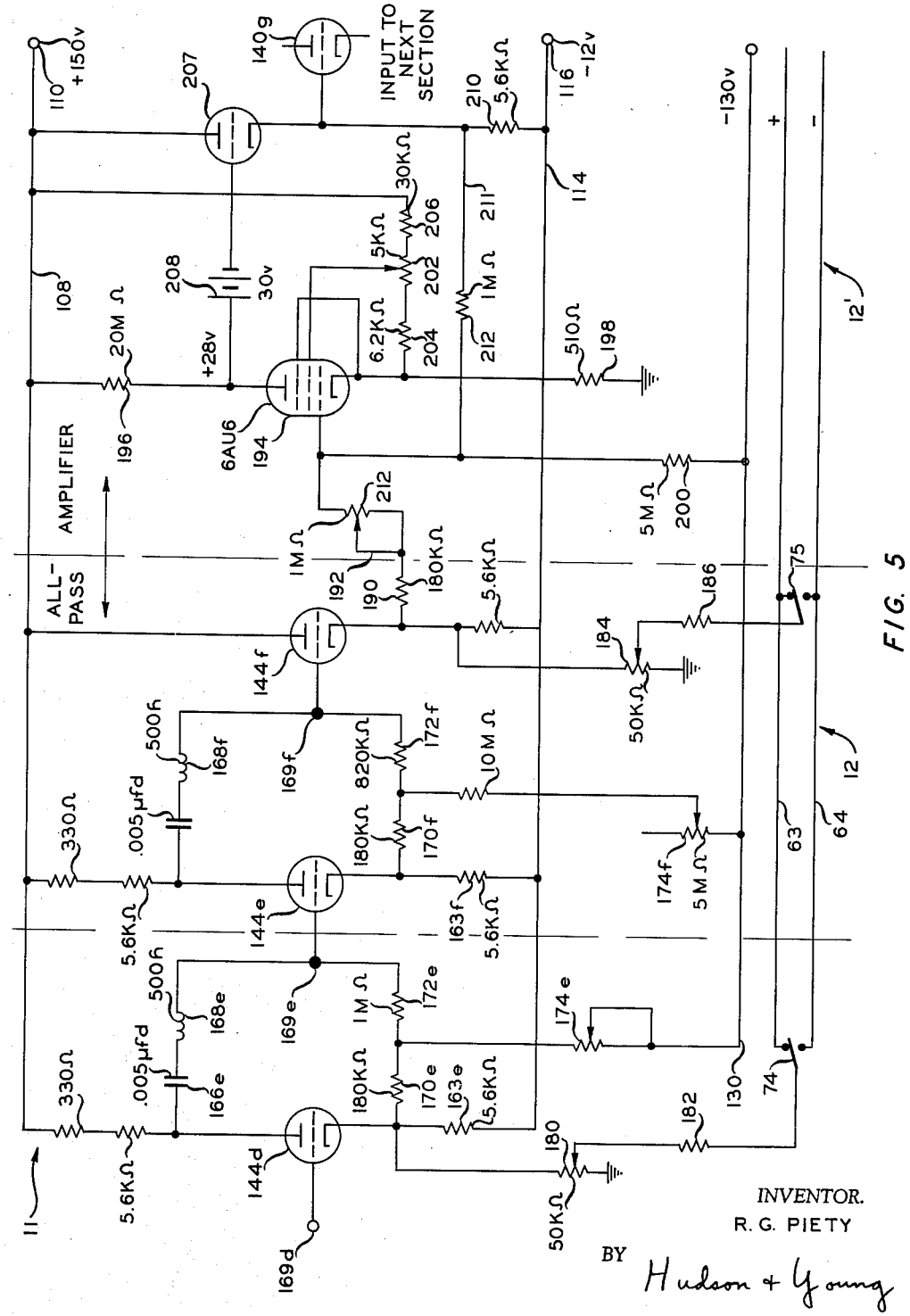
Figure 6:
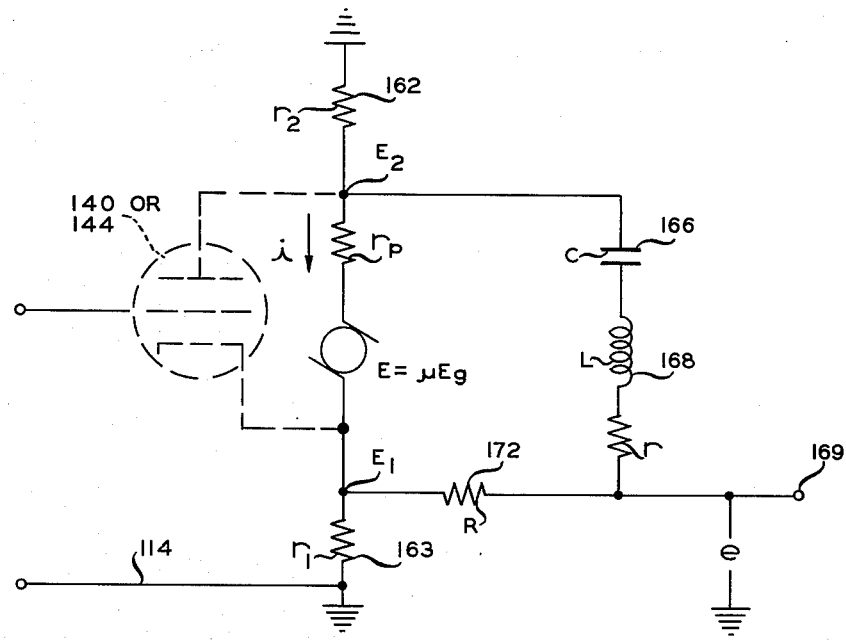

FIGURE 2 is a graph of cardinal function interpolation such as that achieved by the practice of my invention;
FIGURE 3 is a block diagram showing the general manner in which my invention is assembled;
FIGURES 4 and 5 show respective details of FIGURE 3;
FIGURE 6 is an enlarged part of FIGURE 4 or 5.

As explained in Patent Number 2,908,889 and as noted briefly above, seismic exploration and surveying techniques involve detonating an explosive charge, causing the energy pulse from such detonation to travel downwardly through the earth where it is reflected from various layers of geological formations, and recording the signals reflected from such formations with one or more seismometers. Ordinarily, a plurality of seismometers are arranged in a pattern so that information can be gained as to the depth of a stratum and its inclination. By employing a plurality of seismometers, a different path for the energy pulse and its reflections is provided through the earth to each seismometer.

FIGURE 3 shows schematically that my invention comprises a tapped filter network having a cascaded plurality of similar filtering means. At one end of this network is a Butterworth filtering section which has a response to a pulsed input that has zeros spaced to give the interpolating property as represented by the cardinal function of interpolation theory $$\frac{\sin x}{x}$$

A graph of the cardinal function is shown in FIGURE 1 where $$x = \frac{\pi t}{h}$$

from which it may be observed that this function has a sinusoidal-like curve that is symmetric about the zero value ($x=0$) of the horizontal ($x$) axis, has its maximum value at $x=0$, and except for the maximum value peak it has zero crossing points equally spaced by $h$, the time delay, along the $x$ or time ($t$) axis. The zero crossings for the maximum peak are spaced by $2h$. It should be clear that the interpolation property of $$\frac{\sin x}{x}$$

will be obtained if the right and left oscillations each side of center are more highly attenuated or damped. This damping of the oscillations may be different for the right and left sides and the interpolation property will still be maintained. A signal with this damping will be said to be of cardinal type.

Referring to FIGURE 2, consider that a curve of the configuration M is desired to be synthesized. The manner in which this is accomplished is to pulse the network of FIGURE 3, whereupon a signal represented by a function of cardinal type will be produced in each of the individual filter networks of FIGURE 3. However, each of these cardinal functions, as represented by the time at which its maximum value (see FIGURE 1) occurs, is delayed in each section of the network between taps (switches) by the time necessary to make the maximum of any given cardinal type function coincide with the zero crossing time of any other cardinal type function. Certain taps of FIGURE 3 are selected and output signals $C_1$, $C_2$, and $C_3$ are obtained and summed or interpolated to produce M.

The manner of operating my invention, then, is to select those portions of the network of FIGURE 3 that when added together will be interpolated so that the summed output signal is representative of the signal it is desired to synthesize. As seen in FIGURE 2, curves $C_1$, $C_2$, and $C_3$ are summed so that their interpolation reproduces or synthesizes the desired signal M. In other words, a tapped delay line constructed in accordance with my invention makes available $n$ outputs, each delayed by a known interval of time. It is preferred that the delay time intervals, $h$, be of equal value so that maxima occur when zero crossing takes place. As will be further described below, some means for mixing the outputs that are removed from the taps on my delay line work for controlling their individual amplitude and sign, are provided.

FIGURE 3 schematically illustrates a circuit constructed according to my invention. This circuit comprises a plurality of cascaded networks 1-62 that have a low pass entrance section (networks 1-4) connected to a plurality of cascaded all pass sections 5-62, the all pass sections being divided into a phase correcting section (networks 5-10) and a delay section (11-62). The delay section includes taps comprising double throw switches 71-100 disposed at selected points. The signals are applied by the respective taps to the positive or minus buses or output leads 63 and 64, then to mixing amplifiers 65 and 66 from whence the output signal is withdrawn. Any number of networks can be employed in said delay section.

The entrance section of FIGURE 3 includes various phase equalized double Butterworth filters 1-4 that cooperatively produce a predetermined interpolation function which is substantially the same as that illustrated with respect to the cardinal function of FIGURE 1. Butterworth filters are well known in the art and have a characteristic that they provide a maximum flatness of responsive over a certain range of frequencies. These filters and their characteristics are described in the U.S. patent to W. R. Bennett, No. 1,849,656, issued on March 15, 1932. In FIGURES 3 and 4, sections 1 and 2 represent a four-pole Butterworth filter and sections 3 and 4 represent a three-pole Butterworth filter. These Butterworth filters can either be disposed at the entrance section as shown, or they can be split with part of them disposed physically adjacent the input terminal and the remainder disposed physically adjacent and in series with the output terminal. In the typical circuit described, Butterworth filters 1 through 4 are designed to have a resonant frequency of 100 cycles per second.

I have found that a three-pole Butterworth in cascade with a four-pole Butterworth gives the minimum required performance. Higher order Butterworth filters in cascade will also be suitable, e.g., ten-pole filters. The reason for using two Butterworth filters in cascade becomes evident from the following considerations. If the cardinal function of interpolation theory is to be modified to obtain a practical interpolation function, the location of the zeros must be preserved, but the long train of oscillations must be damped out. This would be accomplished if the above function were multiplied by a bell shaped function such as the normal distribution function of statistics. Now the Fourier transform, or frequency function, of the product of two functions is obtained by taking the convolution of their Fourier transforms. Now the Fourier transform of the cardinal function is a real function which is constant from the frequency $-f_c$ to an upper frequency $+f_c$ (cutoff frequency). At the frequencies $-f_c$ and $+f_c$ the function is equal to one-half the constant value. Now the Fourier transform of the normal distribution function is proportional to another normal distribution, but with a different standard deviation. The shape of the convolution of the Fourier transforms for a small standard deviation will be a function which is almost constant in the middle, terminating about the $-f_c$ and $+f_c$ points with a smooth rounding curve falling to the half amplitude point at the cutoff frequency, and then falling to zero along the same curve as it fell to the half point, except that it is rotated 180°. It is clear that this same symmetry would hold for a variety of similar symmetric curves. By this argument the essential character of a damped cardinal function Fourier transform is determined. The next step is experimental. Now a Butterworth filter has an amplitude of one over the square root of two at the cutoff frequency so that two in cascade have an amplitude of 0.5 at the cutoff frequency, which meets one requirement. With phase equalized three-pole and four-pole Butterworth filters in cascade the zeros are quite evenly spaced. In general, higher order pairs of Butterworth filters will improve the precision at the additional expense of a more complicated phase equalizer. The definitions of poles and zeros, as used with repect to these filtering networks, and in particular the Butterworth filters, is found in E. A. Guillemin, "Introductory Circuit Theory," Wiley (1953), Library of Congress card 53-11754. Poles and zeros as used in this connection refer to a mathematical characteristics of the filter network, particularly with respect to the plotting of the real and imaginary values of the ratio of the output to the input voltage (the characteristic) on polar coordinates representative of the electrical engineering term $S=jw+\sigma$ as defined below in the discussion of FIGURE 6. The combination of a 3 and 4 pole Butterworth in cascade produces poles located at 0°, 22.5°, 60° and 67.5° from the horizontal axis of such a plot of S.

The construction of the Butterworth filter is shown in detail in FIGURE 4, where sections 1-3 are constructed of like elements. Only section 1 will be described, sections 2 and 3 being constructed like 1 but their respective elements being denoted by the postscripts "a" and "b." Input signals are received in 1 at input terminals 101 and 102. A pulse or a series of pulses as may be provided by a signal generator or pulses generator (not shown) or a signal from the playing of a recorded seismic signal constitutes the input signal. Terminal 102 is grounded and terminal 100 is connected to the control grid of a triode 106 which is in turn connected to ground by resistor 104. The anode of 106 is connected by a lead 108 to a +150 volts D.C. source, denoted as 110.

The triode is essentially a cathode follower and has its cathode connected via a resistor 112 to lead 114 which is in turn connected to a source of negative potential (−12 volts) 116.

The output from the triode is transmitted to triode 106a of section 2 by an RLC circuit comprising resistors 120, 122 and coil 124 connected in series between the cathode of triode 106 and the control grid of the triode 106a. A third resistor 128 is connected at one end to the junction between 120 and 122 and at the other end to a −130 volt source, lead 130. The filtering circuit is completed by the condenser 132 which connects beween the control grid of 106a and a lead 114. A similar RLC circuit connects 106a to triode 106b in section 3.

The foregoing description applies to the first three sections of the Butterworth filters as shown. Section 4 of the Butterworth filters gives a single pole on the real axis consequently it has no inductance in its circuit. The cathode of 106c has an output circuit that includes resistors 120c and 122c connected in series between the cathode of 106c and grid of triode 140. The control grid of 140 is also connected to the negative lead 114 by the condenser 132c.

The entrance section is completed by the phase correction sections of which 5 and 6 are principal components. The input terminal of the phase corrector comprises the grid of triode 140 (FIGURE 4). In section 5, the anode of 140 is connected by means of resistor 142 to the positive D.C. lead 108 and the cathode is connected by means of resistor 143 to the lead 114. Triode 140 is connected to the grid of the triode 144 of the next succeeding section, 6, by a condenser 146 and coil 148 connected in series between the anode of 140 and the grid of 144. Resistors 150 and 152 are connected in series between the cathode of 140 and the grid of 144. A third resistor 154 is connected at one end to the junction between 150 and 152 and at the other end to a junction 156. The junction is connected to the terminal 130 and also is connected to an adjustable D.C. source comprising a 130 volt battery 158 and a potentiometer 160 having one end thereof connected to a −12 volts source and the other end thereof to ground. This provides a vernier adjustment between −130 volts when the contactor of the potentiometer 160 at the grounded end and −142 volts when at the opposite end. Section 5 is designed for a resonant frequency of 200.

The phase corrector is constructed in a manner generally similar to that for section 5, having the anode of triode 144 connected to lead 114 by resistor 163. Condenser 166 and coil 168 are connected in series between the anode of 144 and the output terminal 169 of the phase correction section. Resistors 170 and 172 are connected between the cathode of 144 and the terminal 169. A resistor 174 has a common junction with 170 and 172, being connected between such junction and the negative terminal 130. The phase corrector 6 is designed for a resonant frequency of about 140 cycles per second.

Sections 7–10 (FIGURE 3) are constructed similarly to section 6. For example, terminal 169 is connected to the grid of a triode 144a (not shown) in section 7. However, a double throw switch 71 (FIGURE 3) is connected to receive the signal from the cathode of 144a and to apply it to either of the output buses 63 or 64. This is like the structure for tube 144d in FIGURE 5, described below.

Networks 5 through 10 are all pass phase correcting sections. Blocks 5 and 6 have been described and the remaining all pass sections are generally similar thereto. However, in sections 7–10 taps are provided to draw the output signals from each such network and apply it to the appropriate one of a positive or negative bus, thence to the mixing means 65 and 66, then to the output. FIGURE 3 shows a plurality of such taps 71, 72 . . . 75 . . . 100. Blocks 7 through 10 are designed for a frequency of 120 cycles per second expressed in radians as 754 per second. Networks 11 to the end, here 62, are designed to have a radian frequency of 1346 radians per second (radian frequency=$2\pi f$, where $f$ is expressed in cycles per second).

In FIGURE 5 are shown the details of all the pass sections along with the gain restoring amplifier stage. Because of the large number of cascaded sections there is a gradual reduction in the signal from section to section since the voltage developed at the cathode due to an input at the gird is less than the grid voltage and the method of biasing introduces a small loss. Consequently, it is necessary to restore the signal amplitude by inserting a stage of gain in conjunction with the all pass sections as is shown in FIGURES 3 and 5. However, it is not necessary to amplify between every single stage, or even between every other stage or every pair of stages. I have found for a system employing up to 62 networks (including the Butterworth and the phase corrector) that gain can properly be restored by inserting amplifiers 12', 22', 32', 42', 52' in cascade with the networks after takeout taps 75, 80, 85, 90, and 95, i.e., after the all pass networks with the corresponding unprimed number. Also, I have found that it is not necessary to have takeout taps after every all pass network, but that takeout taps can properly be inserted between pairs of networks after section 10, e.g., between 31, 32 and 33, 34 and between 41, 42, and 43, 44, etc., as seen in FIGURE 3; with this arrangement I adjust all pass sections 11–62 to have one half the time delay of sections 7–10.

The output from network 62 is isolated from the summing or mixing amplifiers 65 and 66 by a triode corresponding to a triode such as 144d, for example. The mixing or summing amplifiers each sum their respective input signals, with 65 summing all plus signals and feeding them into 66 for addition to the minus signals to produce a single output. Amplifier 65 performs a phase inversion so that one group of signals is effectively subtracted from the other.

FIGURE 5 shows the details of a typical all pass network and amplifier stage. Delay line filter networks 11 and 12 and taps 74 and 75 are shown by way of example. These networks are constructed in the same manner as is network 6 with a main exception that the taps 74 and 75 are provided. Terminal 169d and cathode follower 144d comprise the output terminal from network 10, not shown in FIGURE 5, and the input terminal for network 11. The tap 74 comprises a double throw switch that connects the output to either the + or − signal lead 63 or 64 and is connected by a potentiometer 180 in series with a resistor 182 to the output of the cathode follower. Tap 74 actually transmits the output from section 10 to the output bus. The cathode follower serves to isolate each stage from the next succeeding network and as a signal generator for the downstage network in the sense that the signal produced by the anode-cathode circuit of 144d is applied to the filter network of 11, thence to the grid of 144e, and in the same manner from 144e to 144f. The output from all pass section 12 is drawn from the cathode of 144f and is applied across the gain or amplitude control potentiometer 184 and gain resistor 186 to the tap 75. One terminal (of the resistance element) of potentiometers 180, 184 is grounded. Other pairs of all pass sections such as 13, 14; 15, 16; 17, 18 . . . 61, 62 are constructed in like manner, the lower numbered one of each pair not having an output tap.

In those networks associated with an amplifier, such as that of FIGURE 5, the amplifier is connected to the output of the cathode follower from which the signal is drawn to the positive or negative lead 63 or 64. In FIGURE 5 this is shown as cathode follower 144f. A starved grid amplifier is used. The signal from 144f is across resistor 190 and a gain adjusting resistor (potentiometer) 192 to the control grid of a pentode 194, the anode and cathode of the latter being connected to the lead 103 and ground by resistors 196 and 198, respectively. Negative terminal 130 is connected to the control grid across resistor 200. The suppressor grid is directly coupled to the cathode and the screen grid is connected to the contactor of potentiometer 202, the resistance element of 202 being connected in series between a resistor 204 and a resistor 206. Lead 108 is connected to the resistor 206. A cathode follower 207 and a 30 volt battery 208 are provided. The positive terminal of 208 is connected directly to the anode 194 and the negative terminal of the battery is connected to the control grid of 207. The anode of 207 is connected to lead 108. The cathode of 207 is connected to the lead 114 by a resistor 210. The cathode of 207 is also connected by a lead 211 to the feedback circuit comprising resistor 212, thence to the control grid of 194. The output terminal of the amplifier is represented as triode 140g and this constitutes the input to the next succeeding circuit which will be the pair of all pass sections 13, 14. It will be noted that not every network has an input triode 140, 140g (see FIGS. 4 and 5): triodes 140, 140a . . . constitute the voltage generator when entering an all-pass network from another kind of network, e.g., from an amplifier or a Butterworth filter section.

In one actual embodiment, the components for all pass sections were sized as shown in FIGURE 5, wherein many reference numerals have been omitted for the sake of clarity. All inductances 168 are 500 henries. In cascade, time delay $h$ was five milliseconds for each of networks 7–10 and was 2.5 milliseconds for each of 11–62, the latter group being used in pairs. This assured that the zero crossing times would coincide with the maxima of the cardinal function with each of the sections.

The relationship between the components in one delay network is better understood by referring to FIGURE 6 which illustrates a circuit equivalent to the elements 144 through 169 as seen in FIGURE 4, and where:

$e$=the output voltage
$C$=capacitance of 166 in farads
$L$=inductance 168 in henries
$r$=resistance of 166 and 168 in ohms
$R$=resistance of 172 in ohms
$r_1$=resistance of 163 in ohms
$r_2$=resistance of 162 in ohms
$r_p$=plate resistance of tube 144, ohms $i$ = plate to filament current in tube 144, amperes
$E$ = voltage, plate to filament in tube 144,
$E$ = tube gain, $\mu$, multiplied by the grid voltage, $Eg$
$E_1$ = voltage at the cathode
$E_2$ = voltage on the plate (anode) of 144
$S$ = a complex variable = $jw + \sigma$
$w$ = the radian frequency $2\pi f$, radians per second
$f$ = frequency, cycles per second (resonant frequency)

S is further explained in Chapters 2 and 7 of Thaler and Brown, Servomechanism Analysis, publ. 1953 McGraw-Hill Book Co. (Library of Congress card 52–6005).

Assume R is large enough so the shunting effect of R, L and C is negligible. Than output voltage $e$ is:

$$e = (E_2 - E_1)\frac{R}{R + r + SL + \frac{1}{SC}} + E_1$$

where $E_1 = ir_1$, $E_2 = -ir_2$ $$i = \frac{E}{r_1 + r_2 - r_p}$$

To express $e$ in terms of the voltage E across tube 144, the values of $E_1$ and $E_2$ are expressed as:

$$E_1 = -E\frac{r_1}{r_1 + r_2 + r_p}$$

and $$E_2 = -E\frac{r_2}{r_1 + r_2 + r_p}$$

Substituting for $E_1$ and $E_2$ and manipulating $$e = E\frac{r_1(LCS^2 + (r - Rr_2/r_1)CS + 1)}{(r_1 + r_2 + r_p)(LCS^2 + (R + r)CS + 1)}$$

Now, in order for $e$ to have an amplitude independent of frequency, the center or imaginary term of the numerator should be the negative of the imaginary term in the denominator. This occurs when $S = jw$ and it requires that $$r_2 = r_1 + \frac{2rr_1}{R}$$

I have found, in the circuits disclosed herein, that $r_2$ is about 6 percent larger than $r_1$. With my design of the delay line filters, more vacuum tubes are used, thus providing a certain amount of isolation between the individual networks while permitting the use of an inductance of the same size in each network. A 500 henry value of the inductance of coil 168 is used in all of the all-pass sections, 5–62. For convenience, the inductance of coils 124, 124a, 124b in sections 1–3 is of the same value. Also, in accordance with my design, the all-pass sections 11–62 have poles and zeroes as discussed by Guillemin supra, and in my design are all adjusted and biased to provide, at a radian frequency ($w$) of 1346 radians per second, 4 coincident poles at an angle of 34.75° to the horizontal axis in the plot of S. Similarly, the plot of S for the phase correcting networks 5 and 6 provide poles at 80° and 78°, respectively, at respective radian frequencies of 1256 and 880. Further, networks 7–10 are all adjusted to provide poles at 20° on the plot of S, and a radian frequency of 754. Also, networks 7–10 have condensers with a capacitance of .00352 microfarad. Condensers 132 (FIG. 4) have 0.005 μf. capacitance and condensers 146 and 166 have capacitances of about 0.00127 μf. and 0.00258 μf, respectively.

With the parameters of the individual networks adjusted to yield the foregoing values of the poles at the respective radian frequencies (which are also the resonant frequencies of the respective networks), it is found that:

(1) The wave-form at the first four taps is an output pulse having the character of an interpolation function of Lagrangian type. It is asymmetric, hence the phase correction is not completed this far forward in the system;

(2) The resistors 180 and 184 in the all-pass sections from 11–62 must be respectively manually adjusted to complete the correction of the wave-form amplitude;

(3) Adjustments are made to produce zero crossings at the required intervals on resistors 174, 174a, 174b etc; and (4) Resistors 152 and 172 in each respective pair of all-pass networks from 11 to 62 should have respective resistances of 1 megohm and 820,000 ohms.

The output waveform is observed by applying the output signal to the screen of a cathode ray tube, and the various taps 71–100 are manually manipulated to produce the desired wave form.

In arriving at a particular output waveform with my invention, each tap 71–100 is moved manually to one of three positions: to connect the positive bus 63 to the output of an all pass network; to connect the negative bus 64 to the output of an all pass network; or to a neutral position where the particular all pass network is not connected to anything i.e. its output is not utilized. Where necessary to have a particular amplitude at a particular delay time, resistors 180 and 184 or their equivalent in each all-pass network, or pair of networks are appropriately manually adjusted. Where required, bias adjustments are made by manipulating the contactor of potentiometer 160 and/or by setting the adjustable resistors 174.

In one preferred embodiment, the various individual networks were designed and adjusted to provide the following values of resonant frequency ($f$) and of the location of the poles in the Nyquist diagram or polar plot of the complex variable S:

| Network No(s). | $f$, radian frequency, radians/sec. | Angular location of poles in plot of S, degrees |
| --- | --- | --- |
| 1 | 628 | 22.5 |
| 2 | 628 | 67.5 |
| 3 | 628 | 60 |
| 4 | 628 | 0 |
| 5 | 1256 | 80 |
| 6 | 880 | 78 |
| 7–10 | 753–754 | 20 |
| 11–62 | 1346 | 34.75 |

An explanation of the Nyquist diagram, or transfer-function plot, is found in chapter 7 of Thaler and Brown, supra. The angles of rotation of the vectors in the instant diagram locate the poles, and such angles are measured both clockwise and counterclockwise from the horizontal, or, or real value axis. Of course, values lying on the axis represent a pole of 0°.

In operation, the tapped delay line filter system of my invention is connected by its output terminal (FIG. 3) to an oscilloscope to enable observation of a wave form. A pulse generator is connected to the input terminals 101, 102 (FIG. 4). Each individual network, in particular the phase correction and all-pass networks, are then adjusted to produce appropriate wave forms delays and amplitudes by sequentially observing on the oscilloscope their respective responses to input pulses. The entire system is then pulsed and the various taps are selectively and manually moved to one of the three positions, meanwhile observing the output waveforms on the oscilloscope. When an appropriate waveform is produced by setting various ones of the taps, the system has been completely adjusted for the synthesis of such waveform. The waveform can now be reproduced by pulsing the circuit and employed as indicated above to remove noise, or for other purposes as required by those skilled in the art.

While I have disclosed and shown my invention with regard to a specific embodiment with specific sizes of parts, I do not intend to limit myself thereto but to include all those modifications thereof by one skilled in the art that are within the scope of the disclosure and the following claims.

What is claimed is:

1. A delay line filter comprising a low pass section having a three-pole Butterworth filter connected in cascade with a four-pole Butterworth filter, said low pass section being constructed to pass frequencies in the range of 0 to 100 cycles per second, and an all pass phase adjusting network connected in series with said Butterworth filters; an all pass filter section connected in series with said low pass section, said all pass filter section comprising a plurality of cascade-connected all pass filter networks having one half the time delay of said phase adjusting network; first and second output signal buses; switching means to connect the outputs to selected ones of said all pass filter networks selectively to said first and second buses; and means connected to said buses to combine the signals applied to said first and second buses so that signals applied to said second bus are substracted from the signals applied to said first bus.

2. The delay line filter of claim 1 wherein an amplifier is connected between selected ones of said switching means and the next succeeding filter network.

3. A delay line filter according to claim 1 wherein each all pass section comprises first and second input terminals; first and second direct current potential sources; a cathode follower vacuum tube having a control grid connected to said first input terminal, an anode and a cathode; a first resistor connected between said cathode and said first potential source; a second resistor connected between said anode and said second potential source; a circuit connected between said anode and said cathode comprising, in series, a condenser, an inductance, a first voltage terminal, and a resistance assembly having a second voltage terminal between the ends thereof; and a third potential source connected to said second voltage terminal.

4. The delay line filter of claim 3 wherein one of said switching means comprises a switch adapted to engage said bases selectively, and a voltage dividing network connected between said switch and the cathode of the cathode follower in one of said all pass sections.

References Cited by the Examiner
UNITED STATES PATENTS

| | | | |
|---|---|---|---|
| 2,263,376 | 11/41 | Blumlein et al. | 330—54 |
| 2,854,641 | 9/58 | Daguier | 330—70 |
| 2,926,249 | 2/60 | Lindsey | 328—167 |
| 2,942,195 | 6/60 | Dean | 328—138 |

ARTHUR GAUSS, *Primary Examiner.*

ELI J. SAX, JOHN W. HUCKERT, *Examiners.*

UNITED STATES PATENT OFFICE
CERTIFICATE OF CORRECTION

Patent No. 3,201,706            August 17, 1965

Raymond G. Piety

It is hereby certified that error appears in the above numbered patent requiring correction and that the said Letters Patent should read as corrected below.

Column 9, line 13, for "to", second occurrence, read -- of --; line 17, for "substracted" read -- subtracted --; column 10, line 12, for "bases" read -- buses --.

Signed and sealed this 5th day of July 1966.

(SEAL)
Attest:

ERNEST W. SWIDER            EDWARD J. BRENNER
Attesting Officer            Commissioner of Patents